July 15, 1958
R. F. MEIKLEJOHN
2,843,459
THERMOCHEMICAL LOGGING TOOL
Filed Feb. 7, 1955
5 Sheets-Sheet 1
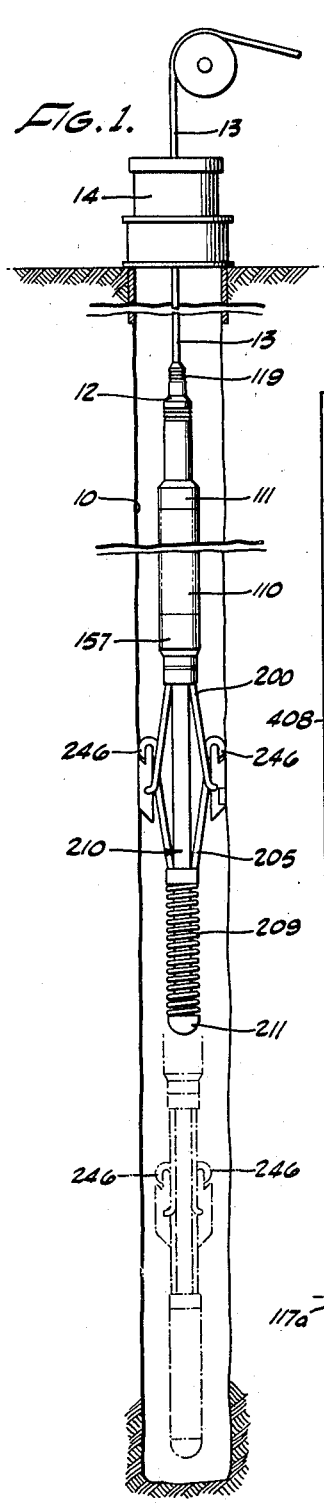
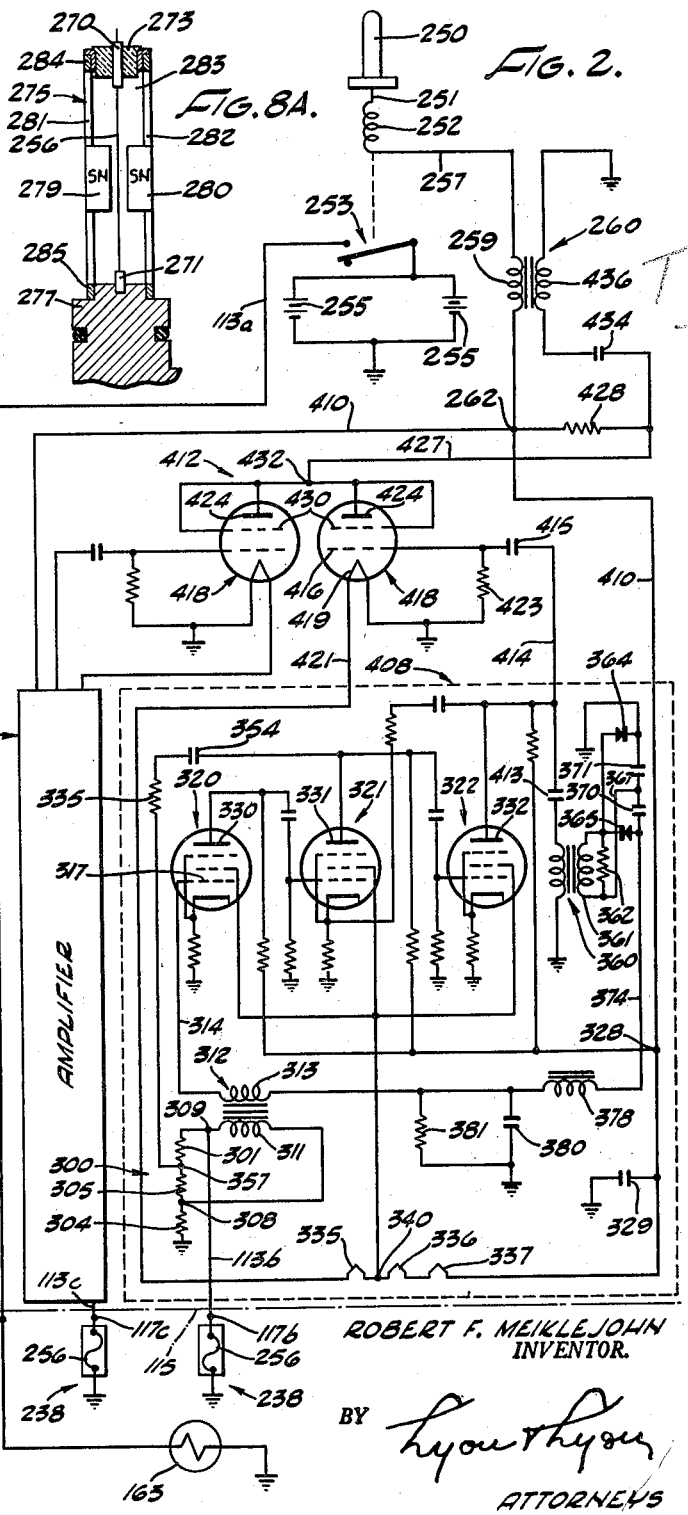
ROBERT F. MEIKLEJOHN
INVENTOR.
BY Lyon & Lyon
ATTORNEYS July 15, 1958

R. F. MEIKLEJOHN 2,843,459

THERMOCHEMICAL LOGGING TOOL

Filed Feb. 7, 1955

ROBERT F. MEIKLEJOHN
INVENTOR.

BY Lyon & Lyon
ATTORNEYS

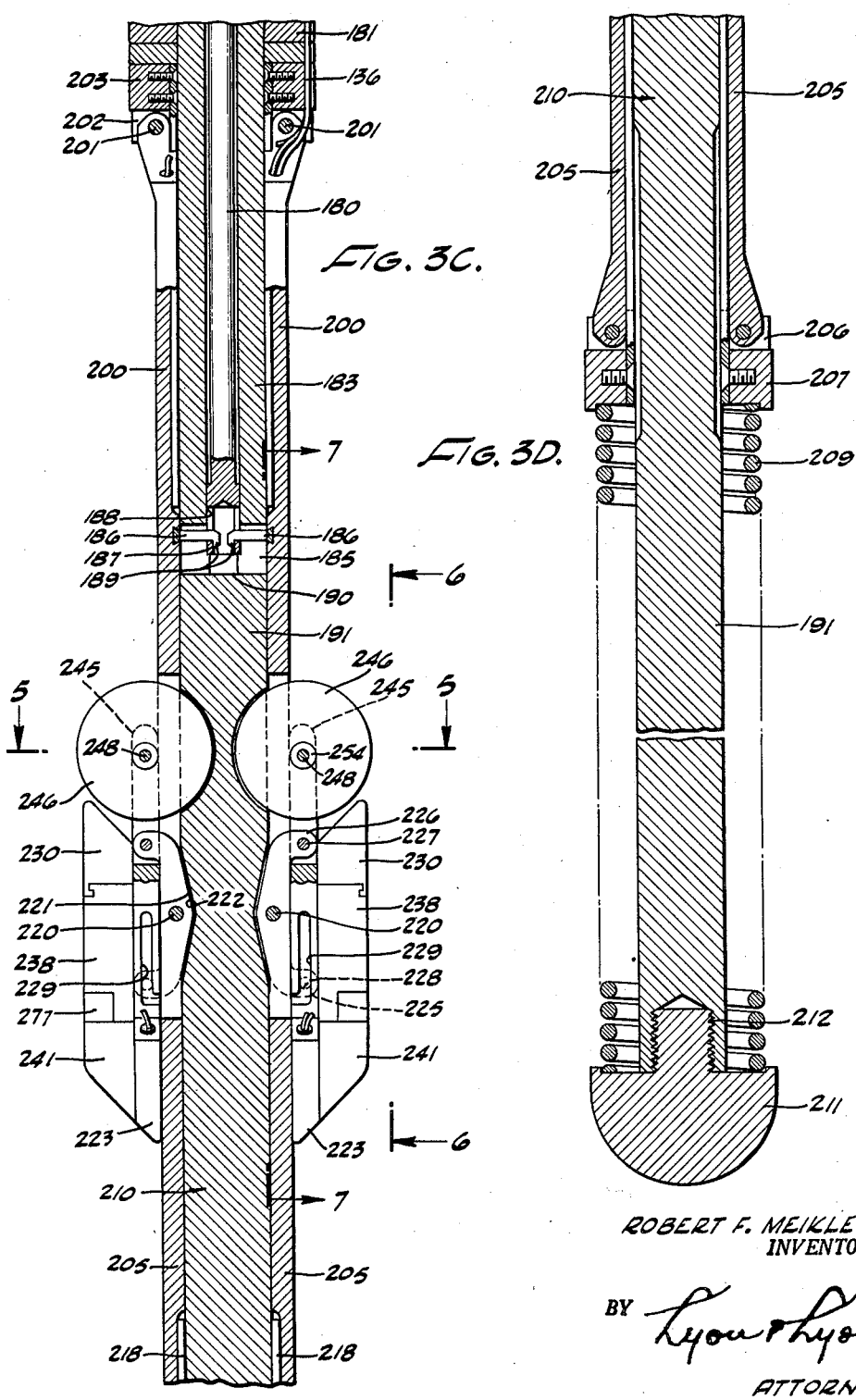

July 15, 1958 R. F. MEIKLEJOHN 2,843,459
THERMOCHEMICAL LOGGING TOOL
Filed Feb. 7, 1955 5 Sheets-Sheet 4

ROBERT F. MEIKLEJOHN
INVENTOR.

BY *Lyon+Lyon*

ATTORNEYS

July 15, 1958  R. F. MEIKLEJOHN  2,843,459
THERMOCHEMICAL LOGGING TOOL
Filed Feb. 7, 1955  5 Sheets-Sheet 5
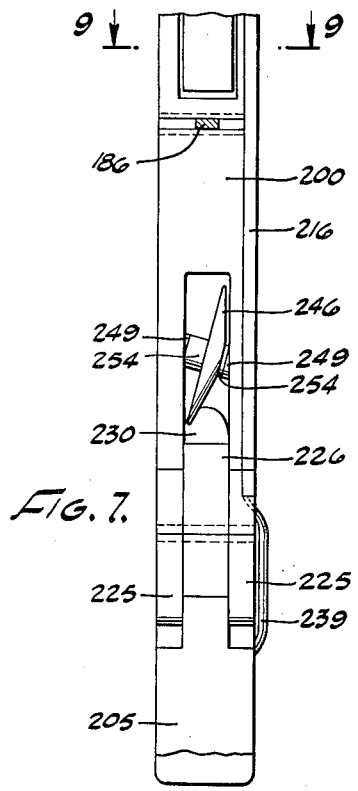
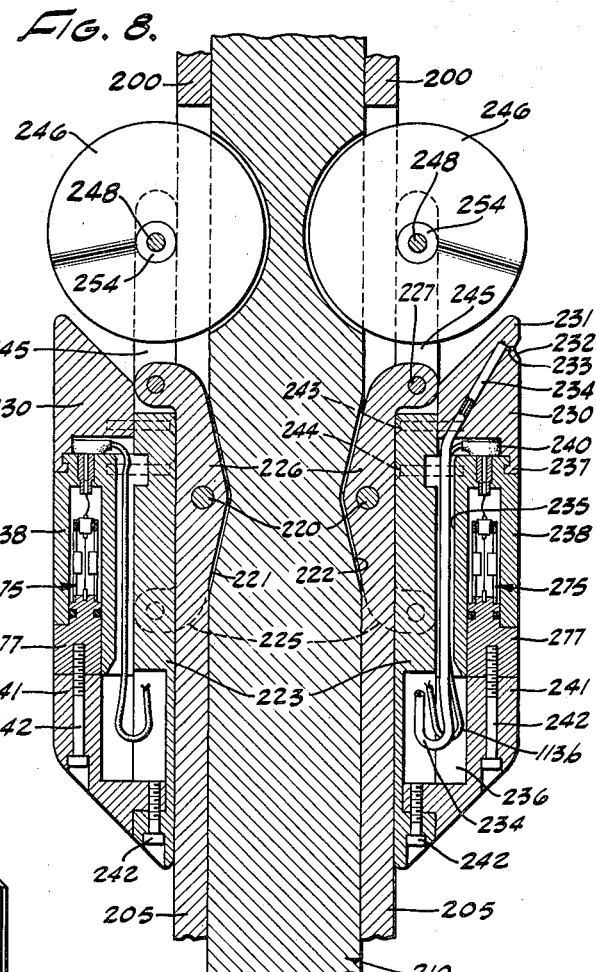
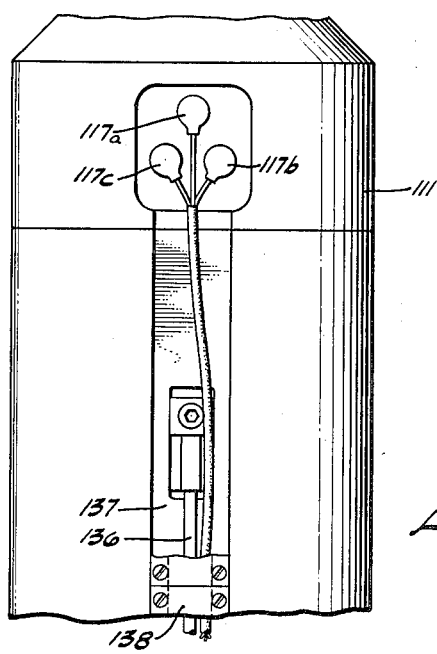
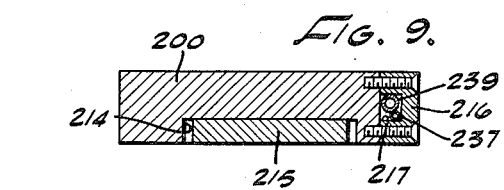
ROBERT F. MEIKLEJOHN
INVENTOR.
BY
ATTORNEYS

United States Patent Office 2,843,459
Patented July 15, 1958

2,843,459

THERMOCHEMICAL LOGGING TOOL

Robert F. Meiklejohn, Los Angeles, Calif., assignor, by mesne assignments, to BJ Service, Inc., Long Beach, Calif., a corporation of Delaware Application February 7, 1955, Serial No. 486,564

8 Claims. (Cl. 23—253)

This invention relates to oil well surveying and is particularly concerned with a means for determining the presence of certain interstitial fluids in a well formation. A vast number of well logging methods have been developed, and many types of apparatus involving intricate sensing means and indicating devices are now in commercial use. These previous logging methods and apparatus have relied on indirect procedures for indicating the character and quantity of fluid content of the formation.

For example, magnetic devices provide logging systems by which the hysteresis characteristics of a formation may be plotted. This information is useful since evidence has been found that a formation having a given reluctance is more susceptible to oil flow than areas of different reluctance. Conductivity also provides indicating evidence; certain methods therefore provide logs depicting the relative conductivity of formation zones, so that oil recovery may be elected on the basis of such findings. Methods and apparatus are available for determining the stratigraphy of a formation so that a layer of sandstone may be determined and distinguished from limestone or shale. However the methods of the prior art all suffer from the disadvantage that they do not provide a direct indication of the presence of oil. The possibility always exists that unknown factors have not been considered, or that the data obtained has been misinterpreted, and an incorrect conclusion reached.

Since the ultimate knowledge to be obtained is whether or not oil is present in a formation, a method of determining that fact directly is preferable. It is also desirable to devise a survey whereby oil bearing areas may be qualitatively and quantitatively analyzed directly.

Certain advantages may be derived in a logging method whereby an earth formation is subjected to the action of selected reagents to induce thermochemical reactions if particular interstitial fluids are present, wherein a hydrocarbon reacting chemical, such as red fuming nitric acid, is applied to successive areas of the wall surface of a well bore. If hydrocarbons are present, an exothermic reaction will result from the application of the nitric acid. The heat of chemical reaction is then sensed to determine the presence of hydrocarbons.

Although red fuming nitric acid is the preferred reagent, others might be used instead. For example, anhydrous nitric acid, white fuming nitric acid, fuming sulfuric acid, or other compounds might be utilized.

Certain variations in the just mentioned method may be availed of. Thus, instead of obtaining information relative to specific occluded fluids in a well formation, data might be assembled to give a stratigraphic picture of the formation. That is to say, by the application of especially selected reagents to portions of the walls of the bore, a log of temperature anomalies at various depths may be obtained. The particular formation reactants causing the anomalies may not be known but a stratigraphic picture can be developed by comparison of the log with data from nearby formations which already have been mapped.

It is of interest to note that this thermochemical logging method is equally applicable to wells in which oil base drilling fluids are used as well as to wells containing only water base drilling fluids. Evidence has been obtained indicating that oil in the drilling fluid, or in the filter cake on the bore walls does not significantly change the data obtained. This is believed to be due to the fact that reactions with formation fluids are sensed before any secondary reactions with hydrocarbons in the well fluid occur.

The method just referred to is not necessarily limited to oil field applications. It may be used whenever advance information is needed, and access to the medium to be explored is not feasible. By a suitable choice of reagents this method can be utilized in mining operations, water well drilling, etc.

Apparatus for performing the method preferably comprises reservoir means coupled to one or more discharge members so that the reagent may be brought into contact with the walls of the formation to be tested. Temperature sensing means are carried adjacent the discharge members to detect the heat of reaction. An electrical signal system is included for surface observation and/or recording of the temperature changes sensed. The occurrence and magnitude of the temperature changes sensed provide a qualitative and quantitative analysis of fluids occluded within the walls of the formation.

In the form of apparatus herein presented, there is a tool having within it a reservoir containing hydrocarbon reacting reagent. Three wall engaging elements are carried by the body. They are forced into expanded position by detonation of a small charge within a control means. Ducts are provided for discharge of reagent, and a first sensing means is utilized to detect the heat of reaction resulting from the union of reagent with hydrocarbons within the walls of the formation. A second sensing device is provided to detect ambient temperatures within the bore hole. A suitable electrical system utilizes the data sensed to actuate a metering unit.

It may be stated that a primary object of the present invention is to provide an improved apparatus for both qualitative and quantitative investigation of well formation fluids.

A more particular object of the invention is to provide an improved apparatus for producing and evaluating chemical reactions within an earth formation so as to provide qualitative and/or quantitative data as to formation fluids.

It is among the further objects of the invention to provide an improved means by which selected reagents may be controllably applied at desired areas of a well bore, as well as an improved means by which chemical reactions resulting from such application may be sensed and recorded.

Since the presence or absence of hydrocarbons in the formation is of paramount concern, it is a specific object of the invention to provide an improved means for subjecting a well bore to the controlled application of a hydrocarbon-reactive reagent, and also provide improved means for detecting the thermochemical reaction which may result.

It is another object of the invention to provide an improved tool of the character described having extensible means carrying reagent discharge nozzles and explosion actuated means to unlatch the extensible means whereby reagent can be applied to selected portions of the walls of a bore hole.

It is another object of the invention to provide an improved tool of the character described wherein reagent is carried within a collapsible chamber, and ejected through discharge ducts against the walls of a bore hole when control means are actuated to collapse the reagent chamber.

It is another object of the invention to provide an improved logging tool controlled to eject reagent against the walls of a bore hole, the tool carrying temperature sensing devices to detect the resulting thermochemical reactions as well as to detect ambient temperatures within the bore hole, and circuit means whereby the sensing devices produce electrical signals which are heterodyned to eliminate the effects of changes in ambient temperatures.

It is among the further objects of the invention to provide a novel logging tool by which the oil-responsive chemicals may be discharged against the formation surface in the presence of sensing devices, as well as means, preferably electronic, by which the response of such sensing devices to the chemical reactions produced by the reagents can be noted and recorded at the well surface.

It is a further object of the invention to provide an improved tool having extensible means which in retracted position permits free passage of the tool to the exploration area and which, upon release, locates reagent nozzles adjacent the formation wall so as to deliver the reagent thereto in a confined area, and which tool carries thermal responsive devices adjacent the reaction area, to faithfully respond to such chemical reactions as may result.

It is also an object of the invention to provide, in a tool of the character described, improved means for mechanically eroding the bore surface so as to facilitate direct contact of the reagent with formation fluid.

Another object of the invention is to provide a tool of the charcter set forth which will be simple, effective and efficient in operation, including such control facilities as to permit the extension of the tool to operative position when desired, release of the reagent as expedient, and transmission of the data sensed to the surface for visual notation or recording.

Numerous other objects, features and advantages of the invention will be apparent from a consideration of the following specification taken in conjunction with the accompanying drawings.

Figure 1 is a schematic view illustrating the invention within a well bore.

Figure 2 is a schematic view of a wiring diagram adapted for use with the apparatus of Figure 1.

Figures 3A, 3B, 3C and 3D are vertical sectional views of successive portions of the apparatus of Figure 1.

Figure 5:
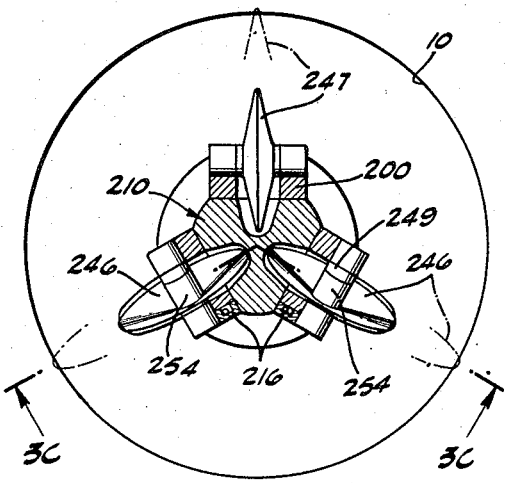

For convenience of illustration Figures 3C and 3D are not shown as plane sectional views, but rather as opened views of the apparatus along the line 3C—3C of Figure 5.

Figure 3A:
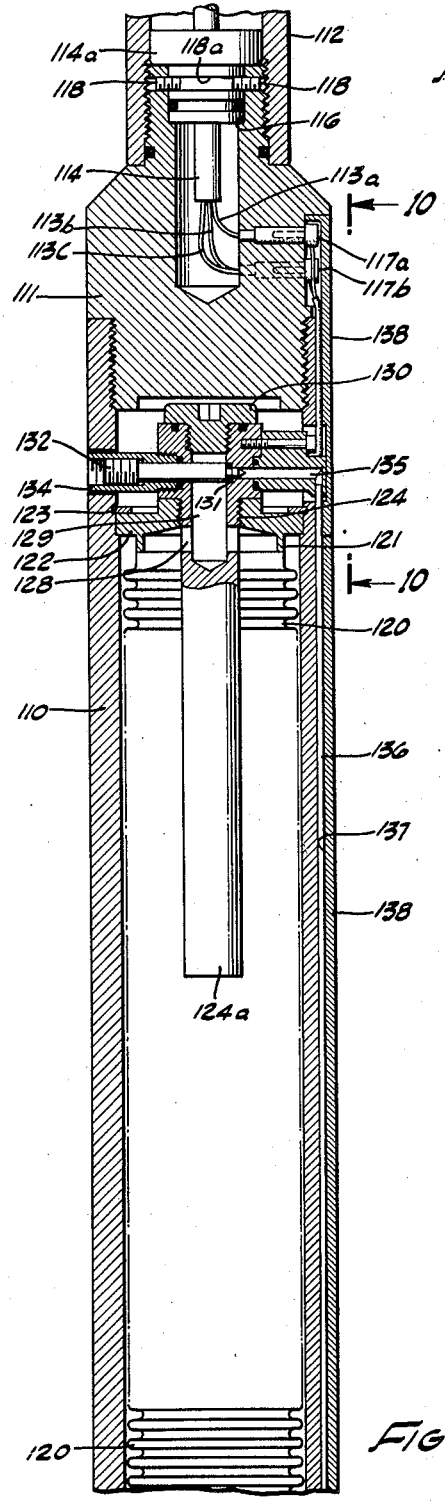
Figure 4:
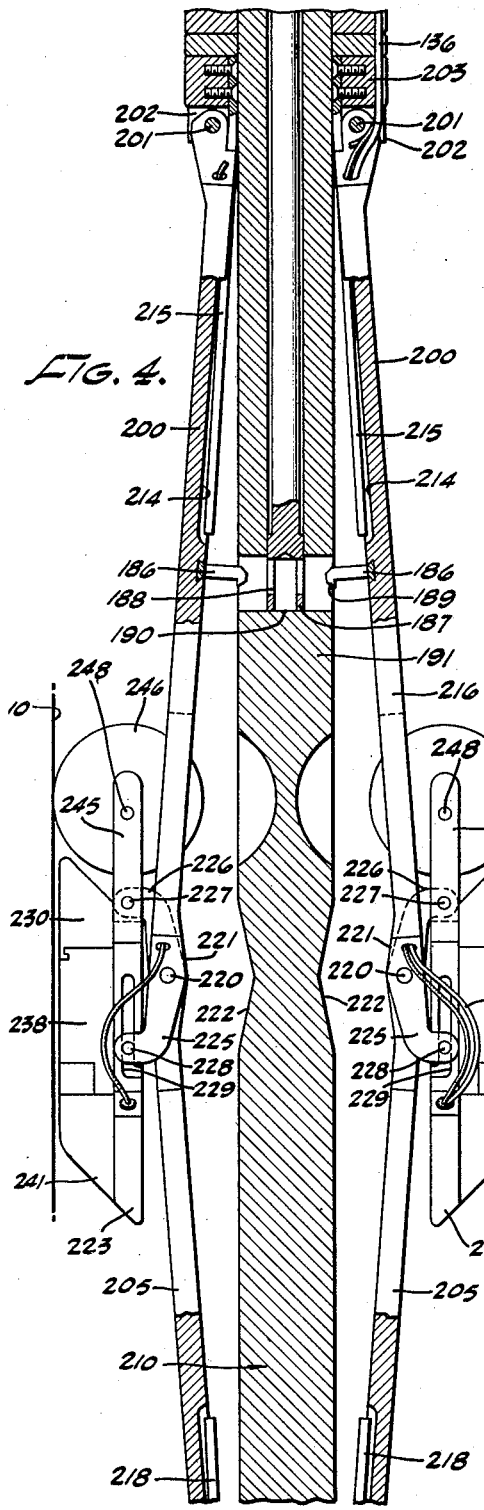

Figure 4 is a sectional view similar to Figure 3C, but shows the toggle arms in expanded position.

Figure 5 is a transverse sectional view taken on the line 5—5 of Figure 3C.

Figure 6:
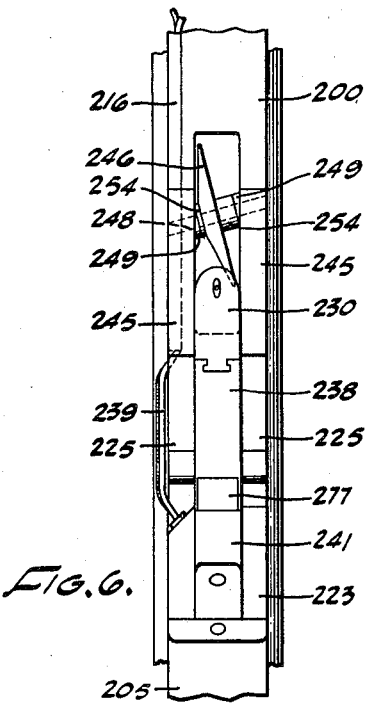

Figure 6 is a detailed side elevation taken on the line 6—6 of Figure 3C, looking in the direction of the arrows.

Figure 7 is a view similar to Figure 6 but taken on line 7—7 of Figure 3C and looking in the opposite direction, as indicated by the arrows 7—7.

Figure 8 is an enlarged detailed view of the carrier members for the reagent discharge and sensing devices.

Figure 8A is an enlarged view of one of the temperature sensing units shown in Figure 8.

Figure 9 is a detailed section taken on line 9—9 of Figure 7.

Figure 10 is a detailed side elevation taken as indicated by the line 10—10 of Figure 3A, looking in the direction of the arrows.

Referring now to the drawings, it will be noted that Figure 1 illustrates the form of tool suspended in the well bore 10 by the cable 13 operating through the head 14. In this view the full line portion indicates the device in operative logging position, while the dotted lines indicate the device in collapsed position as it is run into the well. Figure 1 is a schematic view in that for ease of illustration, the tool is shown as apparently having only two wall engaging elements. Actually there are three such elements, spaced around the tool 120° apart as shown in Figure 5.

As will be seen in Figures 1 and 3A, the upper portion of the tool includes a main body portion 110 into which head 111 is fastened. Conductor thimble 112, in turn, is threaded onto the upper portion of head 111. Two sets of wickers 119 circumscribe thimble 112 to facilitate fishing for the tool if cable 13 should part.

Leads 113a, 113b, and 113c extend through the conductor thimble 112. They are fused within glass rod 114, which in turn is fused within seal sleeve 114a. The rod seal assembly is held within counterbore 116 of head 111 by means of the dogs 118 turned into groove 118a.

As will be explained later, the leads 113a, 113b, and 113c extend between the circuitry above the line 115 of Figure 2, which is carried within thimble 112, and the connector pins 117a, 117b, and 117c. From these connector pins, lead 113a continues to an electrically detonated fracturing charge 163, and leads 113b and 113c extend respectively to two thermally responsive signal generators 238.

As may be seen in Figure 3A, within the upper end of the cylindrical body 110 there is mounted a bellows type compressible reagent chamber 120. The upper end of the chamber is brazed to flange 121 of centrally apertured head block 122, which is retained in position within the body 110 by means of a lock ring 123. Threadedly engaging the central aperture of the block 122 is the valve cylinder member 124. Member 124 has a lower extension 124a which limits the collapsing upward movement of the chamber 120. The valve cylinder member 124 contains transverse reagent receiving ducts 128, which lead to a central reagent discharge passage 129, the upper end of which is closed by threaded sealing plug 130. When the tool is disassembled, plug 130 can be removed and the chamber 120 filled with reagent. Passage 129 has an outlet 131, which forms a seat for valve stem 132. Stem 132 is threaded into sleeve 134. It should be understood that the valve stem 132 is a safety means for precluding accidental discharge of reagent prior to running the tool into the well. When the tool is to be inserted in the well bore the valve stem 132 is retracted by rotating it in the sleeve 134, so as to open communication between the passages 129 and 135. When the reagent chamber 120 is collapsed in the manner explained below, reagent can then flow through ducts 128, passages 129 and 135, and on through reagent tube 136, located within longitudinal channel 137. In the present construction, the channel 137 within which the tube 136 and conductors 113 are located, is covered by a removable plate 138. Channel 137 is best seen in Figure 10.

The lower end of the collapsible reagent chamber 120 is brazed to flange 139 of piston-like actuating plate 140. This plate is threadably secured at 141 to the upper end of a guide stem 142, which is slidably mounted within a guide sleeve 143. This sleeve is threadably secured at 144 within a boss 145 of a transverse base plate 146. Spring 150 is compressed between piston plate 140 and base plate 146. This biases the plate 140 upwardly so that it may tend to collapse chamber 120 and expel the reagent therein. Adjacent the base plate 146 an annular groove 151 is formed in the stem 142. To prevent collapse of the reagent chamber 120 when the tool is not in use, this groove may receive the inner end of a threaded securing pin 152, the head of which engages a threaded port 153 at the lower end of the casing 110. This pin 152, together with the valve stem 132, are inwardly positioned prior to running of the tool into the well. Just prior to its insertion into the well the valve stem and the pin are turned outwardly to open the valve and release the guide stem 142 for subsequent movement.

Figure 3B:
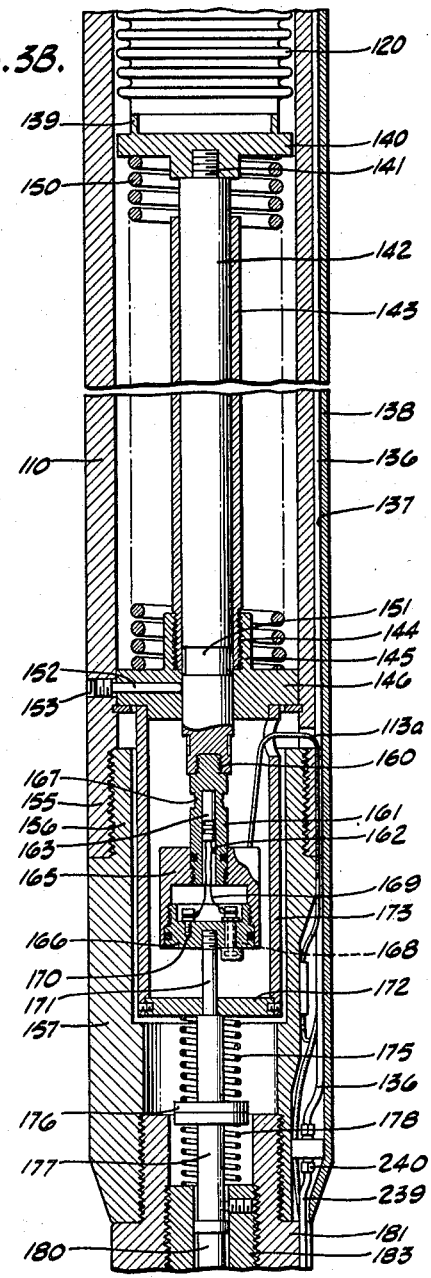

The lower threaded end 155 of the casing 110 receives the upper threaded end 156 of a detonating chamber 157, the upper end of which is closed by the base plate 146. The lower end of the stem 142 extends into the detonating chamber 157, and threadedly engages, as at 160, a frangible retention plug 161. The lower end of the plug 161 is counterbored as at 162 and receives therein a fracturing charge 163, the upper end of which is disposed adjacent to a suitable fracture weakening annular recess 167. The lower end of the plug 161 threadedly engages a connector box 165 which is closed at its lower end by a connector plate 166. A conductor 113a engages the external end of a binding post 168 extending through the plate 166 and conductors 169 lead from the binding post to the charge 163 and back therefrom to a grounding post 170. The plate 166 is threadedly secured to the upper end of a stem 171 which passes through the bottom plate 172 of a detonation cage 173. The cage 173 envelops the connector box 165 and abuts against the base plate 146. Expansion coil spring 175 bears at its upper end against the plate 172 and at its lower end upon the flanges 176. A weaker counter expansion spring 178 is provided so as to offset spring 175 and cushion downward movement of the stem 177. With respect to the operation of this portion of the present structure it will be seen that with the parts in assembled but inoperative position, as shown in Figure 3B, the expansion spring 150 is under compression and tends to move the plate 140 upwardly. Such movement, however, is restrained by the engagement of the stem 142 with the fracture plug 161 since plug 161 is linked to the stem 171, which cannot move upwardly since it abuts the bottom of plate 172. Static equilibrium is therefore maintained until actuation of the device is desired.

When the device is within the bore hole and the logging operation is to commence, an electric impulse is transmitted through the conductor 113a and thence to the fracturing charge 163. Upon detonation of the fracturing charge 163, the plug 161 is fractured by the explosion at the fracture groove 167. The guide stem 142 and reservoir collapsing plate 140 are then released for upward movement under the influence of the spring 150. At the same time the stem 171 is likewise released so that it may move downwardly under the urge of spring 175 and against the rebound spring 178. This moves the stem extension 180 downwardly with respect to the chamber 157.

The lower end of the detonating chamber 157 threadedly engages intermediate coupling 181, which in turn threadedly engages the bored portion 183 of the rigid member 210. The bored portion 183 is cut away as as 185 to receive therethrough arm lock detents 186. The stem 180 is formed with a cylindrical end 187 having side openings 188 which receive therein the hooked ends 189 of the detents 186. The bored portion 183 of the rigid member 210 ends at face 190. From there downward the member is solid, as at 191. In the normal inoperative and latched position of the parts, the stem 184 is in raised position with its end 187 engaging the hooked ends of the detents 189 to preclude outside movement thereof.

Upon detonation of the charge 163 the stem 171 and its extension 180 will be moved downwardly under the influence of spring 175, thus moving the cylindrical end 187 downwardly as indicated in Figure 4 to abut member 191 at face 190. This releases the hooked ends 189 of the detents 186, and allows toggle arms 200 to swing outwardly as explained below.

The device includes three pairs of toggle arms, the upper arms 200 being pivotally mounted as at 201 between the downwardly projecting pivot ears 202 of an upper pivot base 203. The lower toggle arms 205 are similarly pivoted by the pivot ears 206 carried by a lower slidable toggle bracket 207. Bracket 207 is biased upwardly by a helical compression spring 209 circling the lower end of the member 191. The extension 191 is joined to bottom hole engaging head 211 by means of threads 212. The lower end of the spring 209 abuts the inner face of the head 211 while its upper end is seated against the bracket 207 so as to exert upward pressure on the lower pivoted ends of the lower toggle arms 205. Each of the upper toggle arms are provided with recesses 214 adjacent their upper ends (see Figure 9) to receive therein leaf springs 215 secured within the brackets 203 and disposed for normal outward extension of their bottom ends. Similarly, leaf springs 218, which are pinned to bracket 207, tend to bias toggle arms 205 outwardly. When the toggle arms are released for movement from their restrained position the leaf springs will exert an outward pressure on the toggle arms 200 and 205 and effect a break of their straight line relationship. When this occurs, spring 209 is effective to force the toggle arms outwardly to expanded position. The leaf springs 215 and 218 acting together with the helical spring 209 produce a reasonably constant outward pressure on the toggle arms irrespective of the amount of outward displacement of the arms.

As may be seen in Figure 4, the inner cooperating ends of the toggle arms 200 and 205 are pivotally joined by a pivot pin 220. At their juncture they are preferably enlarged by inwardly extending portions 221, adapted to be received within depressions 222 of the bar 210, when the arms are in aligned position. Each toggle arm 200 has a bifurcated end 225 which accepts and is pinned at 220 to the male end 226 of its cooperating lower toggle arm 205. Carrier members 223 are affixed to the male ends 226 by means of pivot pins 227. Pins 228, carried by bifurcated ends 225, slide in grooves 229 of the carriers 223. This guides the carriers so that as the toggle arms expand or contract, the carriers always remain in a vertical position.

The reagent carried within the tool is preferably red, fuming nitric acid. It is discharged by compression of the reservoir 120 at the same time that outward release of the toggle arms occurs. Two temperature sensing devices are required, one of which is carried by the toggle arms having a reagent discharging element. The second sensing device is used to detect ambient temperatures and is associated with another pair of toggle arms. It should be noted that the third pair of toggle arms is provided only to balance the reactive forces of contact of the other two structures with the bore hole wall. This third pair of arms carries neither the reagent dispensing means nor a temperature sensing device.

As shown on the right hand side of Figure 8, the reagent discharging and temperature sensing means comprises a body 230 having an upwardly slanted nose portion 231 provided with a recess 232 communicating with a port 233 through which the chemical reagent is forcibly ejected from a stainless steel reagent conducting tube 234. Tube 234 extends through passage 235 and space 236. Tube 234 is fastened to plastic tube 239 within space 236. The plastic tube 239 passes through channel 217, which is covered by cap 216, as shown in Figure 9, and then continues to union 240 to connect with tube 136. Body 230 is affixed to carrier 223 by means of screws 243. Secured to the lower face of the body 230 by the interlocking tongue and groove connection shown at 237, there is mounted a temperature sensing unit 238. This unit is held in place by screws 244, as well as by end piece 241 and screws 242.

Various temperature sensing units and circuits could be utilized in this tool. For example a resistor which changes its resistance with variations in temperature might be used to vary a control voltage in an oscillator circuit. However a preferred sensing means contemplated for use in this logging tool is similar to that disclosed in Rieber, U. S. Patent 2,689,943 for a Frequency Determining Unit.

As shown in Figures 8 and 8A, each sensing unit includes a fine wire 256 suspended between pins 270 and 271. Pin 270 is enveloped by glass seal 273, which in turn is silver soldered within housing 275. Pin 271 is imbedded within piece 277 and is thereby grounded. Housing 275 is of generally cylindrical form. Housing 275 has a front portion milled out so that permanent magnets 279 and 280 can be soldered to the vertical end faces 281 and 282 respectively of the semicyclindrical wall 283 of the housing. The semicyclindrical wall 283 provides a low reluctance path for the magnetic circuit between the permanent magnets. The milled portion does not extend along the entire length of the housing 275; ring portions 284 and 285 therefore are formed for the insertion of the glass seal 270, and for the fitting of housing 275 onto piece 277. The housing 275 is milled back far enough so that the magnets 279 and 280 are carried in a vertical diametrical plane of the housing. The vibrating wire 256 is therefore centered between the magnets. As will be explained in connection with the circuit of Figure 2, the vibrating wire produces an A. C. signal whose frequency changes with the temperatures being sensed.

Each carrier member 223 includes upwardly extending parallel arms 245. A formation engaging plow disk 246 is rotatably mounted on an axle pin 248, which is affixed to arms 245. Shims 249 are carried between arms 245 and the bosses 254, which are integral with the plow disk. The axial inclination of the disk as shown in Figures 6 and 7 is such as to perform a grooving action along the bore hole in advance of the travel of the reagent dispensing body 230. By cutting away the mud cake, the plow disk makes it possible for the reagent to be applied directly to the bore wall surface. The temperature sensing device will therefore respond accurately to the heat of reaction resulting from the chemical union of the reagent and the interstitial formation fluid.

The assembly shown to the left in Figure 8 is similar to the one illustrated to the right. However, the reagent dispensing means is omitted and therefore the temperature sensing unit therein will respond only to the ambient temperature of the formation. As will be explained below, this will provide a comparison signal, so that changes in ambient temperature may be subtracted out of the end reading.

As indicated in Figure 5, the third pair of toggle arms carry a straight transversely pivoted disk 247, which acts merely to balance the thrust of the disks 246 and to centrally maintain the device in its operating position. It will be seen that the inclination of the disks 246 of the right and left hand carriers of Figure 8 are in opposed angular relation so as to compensate for each other's developed torque as the device is moved upwardly in the formation.

In operation, it will be seen that the tool is shown as being ready for insertion in a well bore, in Figure 3C. In this position the frangible retention plug 161 firmly holds stem 142 so that spring 150 cannot force plate 140 into compressing the chamber 120.

At the same time rod 180 is retained in upward position because of the attachment of its extension 171 to plate 166. In this position cylindrical end 187 engages detents 186 so that toggle arms 200 are retained inwardly against the tension of leaf springs 215. Similarly, lower toggle arms 205 are held in vertical alignment with the upper toggle arms, and against the cantilever action of the springs 218. Compression spring 209 is therefore unable to actuate the toggle arms to extended position.

After the valve stem 132 has been backed out, and safety screw 152 turned out, the tool is lowered to the area to be logged. An electrical impulse is then transmitted through lead 113a to detonate the charge 163. When the charge 163 is detonated the plug 161 is transversely fractured at the annular recess 167. This releases stem 142 and actuating plate 140 for upward movement under the impulse of spring 150. Reagent will thereby be discharged along passages 129, 135, tubes 136 and 239, through the tube 234 and out port 233 of the right hand reagent distributing head 230, of Figure 8. Simultaneously, rod 180 moves downwardly under the influence of spring 175 and cushioning spring 178 to release the detents 186. When the detents are released the springs 215 initiate the outwardly expanding action of the toggle arms 200. Lower toggle arms 205 are also carried outwardly because of the influence of leaf springs 218. Coil spring 209 is then able to move bracket 207 upwardly, fully expanding the toggle arms and thus yieldably urging the plow disks 246 against the bore hole wall. The tool is moved upwardly at a constant rate, and reagent is jetted through port 233 against the wall of the bore hole. As explained later, sensing unit 238 is then effective to generate an electrical signal whose frequency varies with the heat of reaction between the reagent and interstitial formation fluid. The structure previously described provides a uniform rate of discharge of reagent irrespective of sub-surface conditions. The collapsible chamber 120 is pressure balanced internally and externally and discharge of reagent therefrom is effected in response to the application of a predetermined mechanical force to the moveable end wall 140 of the chamber by the spring 150. Thus, it is possible with the present logging device not only to ascertain the presence or absence of hydrocarbon fluids, but also to make a quantitative determination of the amount of such fluids present since variable well pressure is cancelled out. Similarly, the companion sensing head, the left one as shown in Figure 13, generates a signal whose frequency is a function of the ambient temperature in the bore hole. Since the occurence and magnitude of temperature anomalies will be detected, it will be apparent that the arrangement is effective to provide both a qualitative and quantitative analysis of hydrocarbon fluid occluded in the walls of a bore hole.

The rotatable cutting discs 246 and 247 afford a smooth and clean slicing action rather than a tearing and disintegration of the filter cake lining the well bore. A smooth-walled groove will be formed by the cutting discs, such a groove having a number of distinct advantages. One important advantage of the groove is that it makes possible a close sliding fit of the following wall engaging shoe 230 therein. In this manner the ejection of the reagent is isolated from the fluid in the well and its reaction is confined to the formation fluid in the wall of the bore exposed by the groove, it being desirable that contact of the reagent be limited to this fluid as far as possible. Another distinct advantage of the smooth groove cut by the disc cutters, with attendant minimum disruption of the filter cake, is that the remaining undisturbed filter cake continues to perform the important function of protecting porous formations against intrusion therein of water from drilling mud.

In Figure 2, connector pin 250 is the electrical contact for the cable extending down from the surface. When an actuating direct current is applied at terminal 250, current will flow through wire 251 to energize coil relay 252. This will close relay switch 253. Current will then flow from batteries 255, through line 113a, to detonate fracturing charge 163. Current will be returned to input through the ground tool casing and the armored cable covering.

When D. C. potential is applied to connector pin 250, the two amplifier units 408 carried within the logging tool are energized because of the connection through coil 252, wire 257, coil 259 of transformer 260, and tie point 262. Each amplifier unit 408 has a bus wire 410 connected to tie point 262 so that anode, grid, and filament potentials can be applied as described later.

As will be seen in Figure 2, the vibrating wire 256 of each sensing unit 238 is electrically connected to a bridge 300 as by wire 113b. Wire 256 and resistor 301 are in series connection within the bridge, just as are resistors 304 and 305. The resistance of resistor 301 is equal to that of resistor 305, and the resistance of wire 256 in non-vibrating condition, is equal to that of resistor 304. Consequently, at such a time, the potential at point 308 is the same as that at point 309 and no current will flow through the primary coil 311 of transformer 312. When the wire 256 commences to vibrate as a result of a mechanical shock or a stray electric current, its dynamic resistance will change and the bridge will be unbalanced. This will create a potential difference between points 308 and 309 and a current will flow through coil 311. The frequency of this current will be dependent on the natural frequency of wire 256. As changing temperatures are sensed, the natural frequency of the wire changes, thereby varying the frequency of the current flowing through the coil 311. When current flows through primary coil 311, it of course induces a current in the secondary coil 313, the output of which is passed along wire 314 to control grid 317 of a first amplifier tube 320.

Amplifier tubes 320, 321, and 322 are energized by the connection from the surface D. C. power supply through wire 410 to point 328. From this point the required voltage is put on the anode 330, 331, and 332 since they are connected to point 328. Similarly, the filaments 335, 336, and 337 of the respective tubes 320, 321, and 322 are lit because of their connection to point 328. Condenser 329 bypasses to ground the A. C. output of tube 322, so that it does not vary the voltages on the filaments, or the screen grids of the tubes which are tied to point 340. The cathode of each tube is biased in a conventional manner by a resistor between it and ground.

The signal passed along wire 314 to control grid 317 is amplified by tube 320, passed to the control grid of tube 321, amplified again, fed to the control grid of tube 322, and amplified further. The output of this tube is fed to wire 414 for passage to the mixer circuit 412.

In order to sustain vibration of wire 256 in the sensing unit 238, a feedback loop is included in the circuit. The feedback is taken from anode 331 of tube 321, passed through condenser 354 and resistor 355 to point 357 of the bridge 300. From this point the feedback current will divide to flow through resistor 301 and wire 256 in one line, and through resistor 305 and 304 in another line. The current through wire 256 is of proper phase and magnitude to sustain vibration of the wire in the magnetic field created by magnets 279 and 280.

So as to insure a relatively steady gain through the amplifier, and to stabilize the amplitude level of feedback current through the vibrating wire 256, an automatic volume control is also included in the circuit. For this purpose, a portion of the A. C. output from tube 322 is passed through condenser 413 to transformer 360. Condenser 413 prevents short circuiting of the D. C. anode potential to ground. The secondary coil 361 of this transformer, is short circuited by a load resistor 362, which acts to match the transformer impedance with the output of tube 322. The A. C. signal from the transformer is rectified to a pulsating D. C. by means of the selenium rectifiers 364 and 365 which pass current in only one direction. As one side of the secondary coil 361 swings positive, current will pass through wire 367 and rectifier 365 in the direction of the arrow; when the other side of the secondary coil swings positive, current will flow through the rectifier 364 in the direction of the arrow, and back through wire 367. The potential across condensers 370 and 371 is therefore always in the same direction, and a bias voltage on wire 374 is obtained. The rectifiers are arranged so that this bias voltage is negative with respect to ground. The condensers 370 and 371 provide a voltage doubling function since the voltage across one during one half cycle is added to the voltage generated across the other during the next half cycle. This provides a bias voltage of desired magnitude.

The current through wire 374 is smoothed by choke coil 378, and ripple bypass condenser 380 and resistor 381. A ripple-free D. C. potential is thus available to be applied to the control grid 317 of tube 320. This voltage is negative with respect to ground and varies inversely in magnitude with the output of the amplifier. As the amplifier output increases, a greater negative voltage is applied to control grid 317, thus tending to diminish the gain through the circuit. Conversely, as the output of the amplifier diminishes, a less negative biasing voltage will be applied to grid 317, thus tending to increase the amplifier gain.

The output signal from tube 322 is passed along wire 414 through condenser 415 to the control grid 416 of a mixer tetrode 418. The filament 419 of the mixer tube is in series connection with the filaments of the amplifier tubes 320, 321, and 322 because of the connecting wire 421. Grid resistor 423 is provided in the conventional manner as a path to ground for excess D. C. charge on the grid. The anode 424 of each tube 418 in the mixer unit 412 is in direct connection with the source of D. C. potential through wire 427 and anode load resistor 428. The suppressor grid 430 of each tube 418 is tied to its anode 424 in the conventional manner.

The outputs of the two tubes 418 are heterodyned at point 432, passed through wire 427, and through condenser 434 which has a low A. C. impedance compared to the resistance of resistor 428. The sum, the difference, and the individual signals from the amplifiers are present to be passed through primary coil 436 of the transformer 260. The transformer steps up the signal voltages, and they are passed along through contact pin 250, up to cable 13, to the surface instrumentation.

A suitable filter may be provided in the surface instrumentation to pass only the differential frequency for actuation of a suitable metering device. Or if desired one or both of the generated frequencies may be retained and used in the logging. It will be seen that by using only the differential frequency, the circuit would act to subtract out the effect of ambient temperature changes as the tool is pulled to the surface. The metering device would log only the temperature of chemical reaction versus distance from the top of the bore hole.

While there has been described what is at present considered a preferred embodiment of the apparatus aspect of the present invention, it will be apparent to those skilled in the art that various modifications and changes may be made without departing from the essence of the invention, and it is intended to cover herein all such modifications and changes as come within the true scope and spirit of the appended claims.

I claim:

1. Well logging apparatus comprising: a supporting structure adapted to be lowered into a well; an expansible and collapsible chamber carried by said structure and containing reagent reactable thermochemically with selected formation fluids; means forming an outlet passage for said reagent from said chamber to the well wall; spring means tending to collapse said chamber to thereby force reagent therefrom through said passage and into contact with the well wall; means releasably restraining collapse of said chamber under the influence of said spring means; means controllable from the surface of the well for releasing said restraining means; and thermal sensing means adjacent the exit end of said passage for sensing temperature changes induced by said thermochemical reaction.

2. Apparatus as set forth in claim 1, wherein said releasable restraining means comprises a tension member operatively connected to said chamber, and wherein said releasing means comprises a rupturable element connected to said tension member and an explosive charge adapted to rupture said element.

3. Apparatus as set forth in claim 1, wherein said chamber comprises an axially expansible and collapsible bellows having one end thereof fixed to said supporting structure and its other end axially movable relative to said supporting structure, and wherein said spring means comprises a compression spring axially interposed between said movable end of said bellows and an abutment on said supporting structure.

4. Well logging apparatus comprising: a supporting structure adapted to be lowered into a well; an expansible and collapsible chamber carried by said structure and containing reagent reactable thermochemically with selected formation fluids; at least one arm assembly movably carried by said structure and including a wall-engaging member mounted thereon; conduit means carried by said arm assembly and providing communication between the interior of said chamber and a discharge port in said wall-engaging member; first spring means tending to collapse said chamber and thereby force reagent therefrom through said conduit means and said discharge port; first means releasably restraining collapse of said chamber under the influence of said first spring means; second spring means tending to move said arm assembly outwardly and dispose said wall-engaging member in contact with the well wall; second means releasably restraining said arm assembly against outward movement under the influence of said second spring means; a single release member coacting with both said first and said second restraining means and actuable under control from the surface of the well to simultaneously release both of said restraining means; and thermal sensing means carried by said wall-engaging member for sensing temperature changes induced by said thermochemical reaction.

5. Apparatus as set forth in claim 4, wherein said first restraining means comprises a tension member operatively connected to said chamber, said second restraining means comprises latch means releasably interconnecting said arm assembly and said supporting structure, and said single release member comprises a rupturable element operably associated with said tension member and said latch means and an explosive charge adapted to rupture said element.

6. Apparatus for logging a well bore having a filter cake deposited thereon, comprising: a supporting structure adapted to be lowered into a well; a reagent chamber carried by said supporting structure; at least one arm assembly movably carried by said structure and including a wall-engaging member mounted thereon, said member having a radially outwardly directed discharge port therein adjacent the leading end thereof; means forming a fluid passage communicating said chamber with said outlet passage; means for forcing reagent from said chamber through said passage and said port; a cutting disc having a continuous peripheral cutting edge, said disc being mounted on said arm assembly adjacent the leading end of said wall-engaging member for rotation about a tangential axis inclined at an acute angle to a plane perpendicular to the longitudinal axis of said supporting structure; means urging said arm assembly outwardly with sufficient force to cause said disc to penetrate through said filter cake to the earth formation and to cut a longitudinal groove in said filter cake to provide a path for said wall-engaging member as said apparatus is moved along the well bore; and thermal sensing means carried by said wall-engaging member for sensing temperature changes induced by thermochemical reaction between said reagent and formation fluid.

7. Well logging apparatus as set forth in claim 6, wherein the radially outer portion of said wall-engaging member is of a shape to conform to and fit snugly in said groove, whereby to isolate said discharge port from fluid in the well bore and thereby cause said reagent to react only with fluid on the wall of said bore at the base of said groove.

8. Well logging apparatus as set forth in claim 6, including a pair of arm assemblies, and wherein the axes of rotation of the respective discs are offset from said plane in opposed directions, whereby to neutralize torsional forces developed by movement of said discs along the well bore.

References Cited in the file of this patent

UNITED STATES PATENTS 2,708,155 Buckley et al. _____ May 10, 1955